US011679822B2

(12) United States Patent
Stubbe

(10) Patent No.: US 11,679,822 B2
(45) Date of Patent: Jun. 20, 2023

(54) SPOILER LIP FOR ARRANGING ON A FRONT PART OF A MOTOR VEHICLE, AND MOTOR VEHICLE

(71) Applicant: Bayerische Motoren Werke Aktiengesellschaft, Munich (DE)

(72) Inventor: Gregor Stubbe, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/277,666

(22) PCT Filed: Aug. 5, 2019

(86) PCT No.: PCT/EP2019/071018
§ 371 (c)(1),
(2) Date: Mar. 18, 2021

(87) PCT Pub. No.: WO2020/057848
PCT Pub. Date: Mar. 26, 2020

(65) Prior Publication Data
US 2021/0284253 A1 Sep. 16, 2021

(30) Foreign Application Priority Data
Sep. 20, 2018 (DE) ...................... 10 2018 216 007.4

(51) Int. Cl.
*B62D 35/00* (2006.01)
*B62D 35/02* (2006.01)
(52) U.S. Cl.
CPC ........... *B62D 35/005* (2013.01); *B62D 35/02* (2013.01)

(58) Field of Classification Search
CPC .............................. B62D 35/005; B62D 35/02
USPC ............................................ 296/180.1, 180.2
See application file for complete search history.

(56) References Cited

U.S. PATENT DOCUMENTS

| 7,055,891 | B2 * | 6/2006 | Jungert ................ B62D 35/005 |
| | | | 296/180.5 |
| 8,356,856 | B2 | 1/2013 | Danev |
| 9,623,917 | B2 * | 4/2017 | Goldberg ............. B62D 35/005 |
| 2003/0116996 | A1 * | 6/2003 | Soja ..................... B62D 35/005 |
| | | | 296/180.5 |
| 2005/0017541 | A1 | 1/2005 | Jungert |
| 2009/0115221 | A1 * | 5/2009 | Shinedling ........... B62D 35/005 |
| | | | 296/180.5 |

(Continued)

FOREIGN PATENT DOCUMENTS

CN 102785711 A 11/2012
CN 205469341 U 8/2016
(Continued)

OTHER PUBLICATIONS

PCT/EP2019/071018, International Search Report dated Sep. 24, 2019 (Two (2) pages).
(Continued)

*Primary Examiner* — Jason S Daniels
(74) *Attorney, Agent, or Firm* — Crowell & Moring LLP

(57) ABSTRACT

A spoiler lip for arranging on a front part of a vehicle is formed from a fiber composite plastic having at least one bidirectional reinforcing layer made of reinforcing fibers and a plastic matrix which contains an elastomer. The plastic matrix may also contain a thermoset in an embodiment of the spoiler lip.

9 Claims, 1 Drawing Sheet

(56) References Cited

U.S. PATENT DOCUMENTS

| | | | |
|---|---|---|---|
| 2010/0052361 A1 | 3/2010 | Tortosa-Boonacker | |
| 2010/0052362 A1* | 3/2010 | Reuvekamp | B29C 65/02 |
| | | | 296/180.1 |
| 2013/0049399 A1* | 2/2013 | Hoelzel | B62D 35/005 |
| | | | 296/180.5 |
| 2015/0239511 A1* | 8/2015 | Reuvekamp | B62D 35/00 |
| | | | 296/180.1 |
| 2016/0264194 A1 | 9/2016 | Goldberg | |
| 2017/0092022 A1 | 3/2017 | Heil | |

FOREIGN PATENT DOCUMENTS

| | | |
|---|---|---|
| DE | 103 25 652 B4 | 12/2004 |
| DE | 10 2011 050 373 A1 | 11/2012 |
| DE | 10 2015 207 326 A1 | 10/2016 |
| DE | 10 2016 218 182 A1 | 3/2017 |
| EP | 1 484 166 A2 | 12/2004 |
| JP | 2008-307938 A | 12/2008 |

OTHER PUBLICATIONS

German Search Report issued in German application No. 10 2018 216 007.4 dated May 22, 2019, with Statement of Relevancy (Eight (8) pages).
German-language German Office Action issued in German application No. 10 2018 216 007.4 dated May 22, 2019 (Five (5) pages).
English-language Chinese Office Action issued in Chinese application No. 201980036842.3 dated May 23, 2022 (Seven (7) pages).
Chinese Office Action issued in Chinese application No. 201980036842.3 dated Jan. 13, 2023, with English translation (Fifteen (15) pages).

* cited by examiner

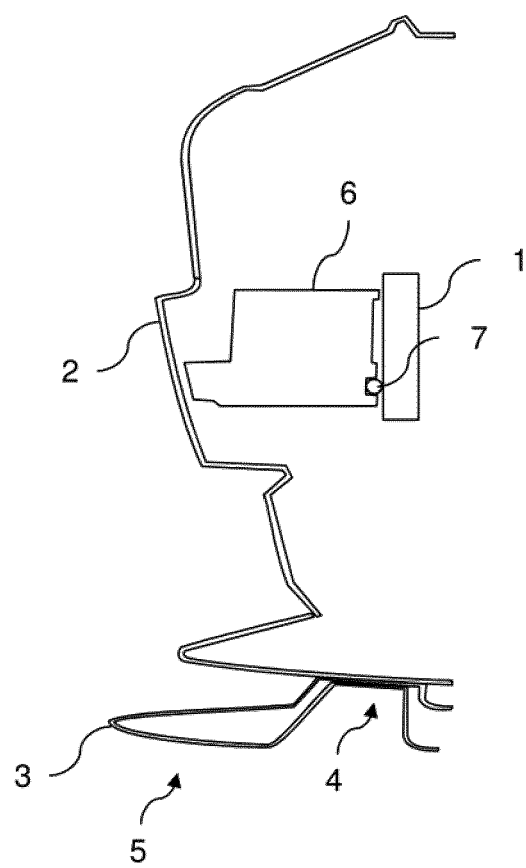

SPOILER LIP FOR ARRANGING ON A FRONT PART OF A MOTOR VEHICLE, AND MOTOR VEHICLE

BACKGROUND AND SUMMARY OF THE INVENTION

The invention relates to a spoiler lip for arranging on a front part of a motor vehicle and to a motor vehicle having a spoiler lip.

To improve the aerodynamics of motor vehicles, the vehicle front is frequently provided with air-guiding devices in the form of spoilers. A spoiler lip is a part of a spoiler that is situated closely above the roadway and is arranged below the front bumper. The spoiler lip has an air-guiding portion which projects in the direction of travel and which splits the relative wind impinging on the vehicle. One part of the air is guided upwardly and banked up. The other part of the air is guided under the vehicle and generates a negative pressure at the front axle.

For design-optical reasons, and in order to optimize the splitting of the air flow, it is desirable for the spoiler lip to project with respect to the bumper fascia in the direction of travel. However, this can lead to problems in the event of a pedestrian impact.

For reasons of pedestrian protection, many vehicles are provided with so-called active pedestrian protection systems. A known pedestrian protection system contains for example a liftable front hood which, in the event of a collision with a pedestrian, is raised by a number of centimeters and thereby provides a buffer for the impact. The impact is detected by a sensor which is arranged between the front bumper fascia and the front crossmember.

This system can give rise to a problem with the projecting spoiler lip: if the pedestrian comes first into contact with the spoiler lip, a rotational movement about the vehicle transverse direction is exerted on the pedestrian. The latter no longer strikes directly against the bumper fascia, with the result that the necessary force to trigger the sensor is possibly not achieved.

Against this background, it is the object of the present invention to specify a spoiler lip and a vehicle that take into account the aforementioned requirements to an improved degree.

A spoiler lip is specified for arranging on a front part of a vehicle, the lip being formed from a fiber composite plastic having at least one bidirectional reinforcing layer made up of reinforcing fibers and having a plastic matrix which contains an elastomer fraction.

The combination of bidirectional fiber reinforcement, embedded in a plastic matrix consisting of elastomer and thermoset, makes it possible to produce a spoiler lip which has an excellent overall component strength, a high bending stiffness but at the same time a low torsional stiffness. The spoiler lip is designed in such a way that it has a high degree of strength with respect to the forces occurring during driving operation. The component is configured to be flexurally rigid in relation to the wind forces acting areally on the component. However, in the event of an accident, a point load acts on the spoiler lip. In this case, by virtue of the reduced torsional stiffness of the spoiler lip, the loaded component portion is caused to "submarine". At the same time, the elastomer fraction in the matrix material also prevents the component from splintering.

The reinforcing fibers can be for example glass fibers, carbon fibers or aramid fibers or other fibers known as reinforcing fibers. The fibers are preferably present as continuous fibers, with the result that the mechanical strength of the component is increased in relation to short fibers. Nevertheless, the concept according to the invention can also be realized with short fibers. The fibers in the at least one fiber layer are present in an orientation as bidirectional fibers. The fibers are preferably oriented in the direction of the longitudinal extent of the component and in the direction of the transverse extent. Furthermore, one or more additional fiber layers can be present. The additional fiber layers can be, for example, oriented or unoriented fibers. In order to realize loading-appropriate stiffening, the additional fiber layers can have, for example, oriented fibers which are arranged in a direction differing from the directions of the fibers of the bidirectional fiber layer.

The at least one reinforcing layer is incorporated in a plastic matrix which contains an elastomer fraction. The elastomer can be, for example, a rubber. In addition to the elastomer fraction, the plastic matrix can further contain a thermoset or thermoplastic material fraction. In one embodiment, it is particularly preferable for the plastic matrix to further contain a thermoset material fraction.

A particularly simple embodiment of the spoiler lip occurs in an embodiment in which the spoiler lip consists of the fiber composite plastic.

From the viewpoint of maximum bending stiffness, it is particularly preferable for the at least one bidirectional fiber reinforcement to be formed from carbon fibers.

In one embodiment, the bidirectional fiber reinforcement is a woven fabric. The oriented fibers are present in the woven fabric in two mutually perpendicular directions. The bidirectionally arranged fibers present in the woven fabric can be oriented in a particularly simple and precise manner during the production of the component, thereby ensuring a high degree of reproducibility of the components. For example, the fibers are oriented longitudinally and transversely with respect to the vehicle front.

For design reasons, it can be further desirable for the spoiler lip to be intended to be a visible carbon component. In this case, for example, the bidirectional fiber reinforcement is formed from carbon fibers and can be seen from a visible side of the component. It can be particularly advantageous here for the elastomer to be arranged on a side of the carbon fiber reinforcement that faces away from the visible side of the spoiler lip. This arrangement allows the advantageous effect of the elastomer to be used without it being able to be seen on the visible side. With particular preference, the elastomer can be present as a layer integrated into the spoiler lip. If, in addition to the elastomer, a clearly curing resin is used as matrix material, it is thus possible in a simple manner to produce a visible carbon component which from the visible side is optically indistinguishable from conventional visible carbon components.

In its installed position in which it is installed on the motor vehicle, the spoiler lip is situated—as seen in the direction of travel—at least in front of a wheel of the front axle. Under aspects of pedestrian protection, it is advantageous if, in one embodiment, the spoiler lip extends only partially over a vehicle width, for example only in a lateral region of the vehicle front. This allows the surface area which can endanger pedestrians to be reduced while the downforce generated by such a spoiler lip is still sufficient. Alternatively, the spoiler lip can also extend over the entire vehicle width.

If the spoiler lip is installed on the vehicle, it is, for example, set against a bumper fascia from below and fastened. For this purpose, in one embodiment, the spoiler lip has a fastening portion. Furthermore, the spoiler lip has an air-guiding portion. It is preferable, in the installed position of the spoiler lip, for the air-guiding portion to project in the direction of travel with respect to a bumper fascia forming the vehicle front. This produces an increased dynamic pressure on the spoiler lip and, resulting therefrom, an increased downforce. At the same time, the projecting spoiler lip allows the vehicle to act more dynamically.

In a preferred embodiment, the spoiler lip is designed as a fixed spoiler lip. In other words, the spoiler lip can be fastened to the vehicle in one position and cannot be moved or folded from this first position into a second position. Such a fixed spoiler lip can be produced in a particularly simple manner.

By virtue of the material selection according to the invention, such a projecting and fixed spoiler lip is possible without additional risk to pedestrians. In the event of a collision with a pedestrian, the spoiler lip is deformed on account of the elastomer fraction. The risk of injury to which a pedestrian is exposed by the spoiler lip is reduced. At the same time, it is ensured that the rotational movement acting from the spoiler lip on the pedestrian is low in the lower leg region. This avoids a situation in which the pedestrian as a result of the collision is prematurely set into a rotational movement that could lead to the fact that an impact sensor arranged between the bumper fascia and crossmember could not be triggered.

Also specified is a motor vehicle having a spoiler lip as described above, wherein the motor vehicle achieves the same technical effects as have been described for the spoiler lip.

Further advantages, features and details of the invention will become apparent from the following description in which exemplary embodiments of the invention are described in detail with reference to the drawing. Here, the features mentioned in the claims and in the description may be essential to the invention in each case individually per se or in any desired combination. Where the term "can" is used in this application, it can refer both to the technical possibility and to the actual technical implementation.

Exemplary embodiments are explained below on the basis of the appended drawing.

BRIEF DESCRIPTION OF THE DRAWING

FIG. 1 shows a schematic sectional illustration of a vehicle front with a spoiler lip.

DETAILED DESCRIPTION OF THE DRAWING

FIG. 1 shows a schematic illustration of a vehicle front in a sectional illustration. A crossmember 1 of the motor vehicle body that acts as a bumper is covered by a bumper fascia 2. Arranged at the lower end of the bumper fascia 2 is a spoiler lip 3. The latter is fastened to the vehicle by a fastening portion 4 and, as viewed in the direction of travel, projects by an air-guiding portion 5 with respect to the vehicle front situated above it.

In the event of a frontal impact, for example against a pedestrian, the bumper fascia 2 and also the deformation element 6 situated between the bumper fascia 2 and crossmember 1 are deformed. A sensor 7, which is arranged for example between the crossmember 1 and deformation element 6, detects the impact and for example ignites an explosive charge which lifts an engine hood (not shown) in order to dampen the impact of the pedestrian.

The spoiler lip 3 according to the invention now ensures that the active pedestrian protection described functions properly even in the event of an impact in the region of the spoiler lip 3.

If the car strikes a pedestrian, the first contact occurs at the spoiler lip 3 since the latter projects with respect to the rest of the vehicle front. There is the risk here that the pedestrian is set by the spoiler lip 3 into a rotation that would lead to the pedestrian striking the bumper fascia 2 above the deformation element 6. In this case, under unfavorable circumstances, the necessary force for triggering the sensor 7 would not be achieved and the active pedestrian protection would fail.

The spoiler lip 3 is produced from a fiber composite plastic with a bidirectional carbon fiber reinforcement and a plastic matrix which contains an elastomer. However, by virtue of the elastomer fraction in the matrix material, the spoiler lip 3 according to the invention can deform under the point loading exerted by the pedestrian and deflect rearwardly and downwardly. The force exerted on the pedestrian is thus considerably reduced and the above-described rotational movement of the pedestrian can be reduced or completely avoided. The contact between the pedestrian and the bumper fascia 2 reliably occurs at the height of the sensor 7.

The spoiler lip 3 can reach over the entire vehicle width. Alternatively, it can also be formed only in the outer edge region of the vehicle.

LIST OF REFERENCE CHARACTERS

1 Crossmember
2 Bumper fascia
3 Spoiler lip
4 Fastening portion
5 Air-guiding portion
6 Deformation element
7 Sensor

What is claimed is:

1. An apparatus for disposing on a front part of a vehicle, comprising:
a spoiler lip, wherein the spoiler lip is formed from a fiber composite plastic that has a bidirectional reinforcing layer made up of reinforcing fibers and a plastic matrix which contains an elastomer, wherein the spoiler lip is a fixed spoiler lip such that the spoiler lip is fastenable to the vehicle in one position;
wherein when the spoiler lip is in an installed position on the front part of the vehicle the spoiler lip has an air-guiding portion which projects with respect to a bumper fascia forming the front part of the vehicle in a direction of travel of the vehicle and which splits a wind impinging on the vehicle, the spoiler lip is flexurally rigid in relation to a wind force acting areally on the spoiler lip and the spoiler lip deforms and deflects rearwardly and downwardly with respect to the vehicle when the spoiler lip is subjected to a point loading by impact with a pedestrian.

2. The apparatus according to claim 1, wherein the plastic matrix contains a thermoset.

3. The apparatus according to claim 1, wherein the reinforcing fibers are carbon fibers.

4. The apparatus according to claim 1, wherein the bidirectional reinforcing layer is a woven fabric.

5. The apparatus according to claim 1, wherein the elastomer is disposed on a side of the bidirectional reinforcing layer that faces away from a visible side of the spoiler lip.

6. The apparatus according to claim 1 in combination with the vehicle, wherein, in the installed position on the front part of the vehicle, the spoiler lip extends only partially over a width of the front part of the vehicle.

7. The apparatus according to claim 1, wherein the spoiler lip has a fastening portion for fastening to the vehicle.

8. An apparatus for disposing on a front part of a vehicle, comprising:
a spoiler lip, wherein the spoiler lip is formed from a fiber composite plastic that has a bidirectional reinforcing layer made up of reinforcing fibers and a plastic matrix which contains an elastomer;
wherein the reinforcing fibers are carbon fibers;
wherein the spoiler lip is a fixed spoiler lip such that the spoiler lip is fastenable to the vehicle in one position;
wherein when the spoiler lip is in an installed position on the front part of the vehicle the spoiler lip has an air-guiding portion which projects with respect to a bumper fascia forming the front part of the vehicle in a direction of travel of the vehicle and which splits a wind impinging on the vehicle, the spoiler lip is flexurally rigid in relation to a wind force acting areally on the spoiler lip and the spoiler lip deforms and deflects rearwardly and downwardly with respect to the vehicle when the spoiler lip is subjected to a point loading by impact with a pedestrian.

9. A vehicle, comprising:
a spoiler lip disposed on a front part of the vehicle, wherein the spoiler lip is formed from a fiber composite plastic that has a bidirectional reinforcing layer made up of reinforcing fibers and a plastic matrix which contains an elastomer;
wherein the spoiler lip is a fixed spoiler lip such that the spoiler lip is fastened to the vehicle in one position;
wherein the spoiler lip has an air-guiding portion which projects with respect to a bumper fascia forming the front part of the vehicle in a direction of travel of the vehicle and which splits a wind impinging on the vehicle, wherein the spoiler lip is flexurally rigid in relation to a wind force acting areally on the spoiler lip, and wherein the spoiler lip deforms and deflects rearwardly and downwardly with respect to the vehicle when the spoiler lip is subjected to a point loading by impact with a pedestrian.

\* \* \* \* \*